(12) United States Patent
Newkirk (10) Patent No.: US 8,163,158 B2
(45) Date of Patent: Apr. 24, 2012

(54) OPERATION OF AN ELECTROLYSIS CELL

(75) Inventor: James S. Newkirk, Leroy, NY (US)

(73) Assignee: ENRG, Inc., Buffalo, NY (US)

( * ) Notice: Subject to any disclaimer, the term of this patent is extended or adjusted under 35 U.S.C. 154(b) by 452 days.

(21) Appl. No.: 12/464,529

(22) Filed: May 12, 2009

(65) Prior Publication Data

US 2009/0325014 A1 Dec. 31, 2009

Related U.S. Application Data

(60) Provisional application No. 61/052,618, filed on May 12, 2008.

(51) Int. Cl.
*C25B 1/10* (2006.01)
*C25B 15/02* (2006.01)
*C25B 15/08* (2006.01)

(52) U.S. Cl. ........ 205/337; 205/349; 205/628; 205/629; 204/228.1; 204/263; 204/275.1; 204/229.8

(58) Field of Classification Search ................... 205/337
See application file for complete search history.

(56) References Cited

U.S. PATENT DOCUMENTS

| | | | |
|---|---|---|---|
| 6,632,347 B1* | 10/2003 | Buckley et al. | 205/620 |
| 7,303,660 B2* | 12/2007 | Buckley et al. | 204/232 |
| 7,393,603 B1 | 7/2008 | Schumer et al. | |
| 2005/0048334 A1* | 3/2005 | Sridhar et al. | 429/21 |
| 2007/0119718 A1* | 5/2007 | Gibson et al. | 205/637 |
| 2009/0263681 A1* | 10/2009 | Atreya et al. | 429/13 |
| 2010/0006122 A1* | 1/2010 | Brown et al. | 134/25.2 |

OTHER PUBLICATIONS

Brisse et al, High temperature water electrolysis in solid oxide cells, International Journal of Hydrogen Energy, vol. 33, Sep. 2008, pp. 5375-5382.*
Korpas et al, Opportunities for hydrogen production in connection with wind power in weak grids, Renewable Energy, vol. 33, Aug. 2007, pp. 1199-1208.*
Ni, Meng, Mathematical modeling of solid oxide steam electrolyzer for hydrogen production (doctoral thesis), The University of Hong Kong, 2007, available at http://hdl.handle.net/10722/51885.*
Grant L. Hawkes et al., "CFD Model of a Planar Solid Oxide Electrolysis Cell for Hydrogen Production From Nuclear Energy", The 11th International Topical Meeting on Nuclear Reactor Thermal-Hydraulics (NURETH-11), INEEL/CON-05-02637, Oct. 2-6, 2005, 17 pages.
J. Stephen Herring et al., "High-Temperature Solid Oxide Electrolyser System", Hydrogen, Fuel Cells, and Infrastructure Technologies, FY 2003 Progress Report, 2003, 5 pages. Steve Herring et al., "High Temperature Solid Oxide Electrolyzer System", 2005 DOE Hydrogen, Fuel Cells & Infrastructure Technologies Program Review, INL Idaho National Laboratory, May 25, 2005, 24 pages.
J. E. O'Brien et al., "Hydrogen Production Performance of a 10-Cell Planar Solid-Oxide Electrolysis Stack", Third International Conference on Fuel Cell Science, Engineering and Technology, INEEL/CON-05-02659 Preprint, May 23-25, 2005, 12 pages.
Mogens Mogensen et al., "Performance of Reversible Solid Oxide Cells: A Review", 2006, 11 pages.

* cited by examiner

*Primary Examiner* — Harry D Wilkins, III
(74) *Attorney, Agent, or Firm* — Walter W. Duft (57) ABSTRACT

An electrolysis cell is controlled for operation under varying electrical power supply conditions. A flow of feed stock to the cell includes an electrolysis reactant at a controlled concentration. A varying amount of electrical power is supplied to the cell to produce an electrolysis reaction that generates a first reaction product at a first side of the cell and a second reaction product at a second side of the cell. The reactant concentration is adjusted as the electrical power varies to substantially maintain the cell at its thermal neutral voltage during cell operation. The cell may be used in an electrolysis system powered by a renewable energy source with varying power output (e.g., wind, solar, etc.).

22 Claims, 6 Drawing Sheets

OPERATION OF AN ELECTROLYSIS CELL

CROSS-REFERENCE TO RELATED APPLICATIONS

This application claims the benefit of U.S. Provisional Patent Application Ser. No. 61/052,618, filed on May 12, 2008 (the '618 application). The contents of the '618 application are hereby incorporated by this reference in their entirety as if fully set forth herein.

STATEMENT REGARDING FEDERALLY SPONSORED RESEARCH OR DEVELOPMENT

This invention was made with Government support under contract W31 P4Q-07-C-0321 awarded by US Army Aviation & Missile Command. The Government has certain rights in the invention.

BACKGROUND

1. Field of the Invention

The present invention relates to electrolysis cells and their operation. More particularly, the invention pertains to the operation of electrolysis cells under conditions of varying power input.

2. Description of the Prior Art

By way of background, an electrolysis cell has electrochemical properties that allow for the conversion of electrical energy into chemical energy. For example, water, in the form of steam, can be converted into hydrogen and oxygen when electrical energy is applied to the cell. As the electrical energy passes through the cell, the electrical resistance of the materials that make up the cell cause some of the electrical energy to be converted into heat (thermal energy). This thermal energy can be used in the electrolysis reaction. As the supplied electrical energy increases, a point is reached where the thermal energy generated within the cell and the supplied electrical energy equals the energy required to complete the reaction. This is called the thermal neutral voltage ($V_{tn}$).

For typical applications where the amount of available electrical power (i.e., energy rate) is constant, an electrolysis cell can be designed to run at $V_{tn}$. However, for applications where the electrical power is changing over time, as is the case for some renewable energy sources (e.g., wind turbines, solar panels, etc.), changes to cell operating conditions will occur. A specific electrolysis cell will have a defined voltage-current (electrical power) curve. Therefore, if no other operating parameters change, as the input electrical power changes, both the voltage and the current must change. The result is that the electrolysis cell may not always be operating at $V_{tn}$. If the electrical power increases, the voltage will exceed $V_{tn}$, causing excess heat to be generated in the electrolysis cell that must be removed. If the electrical power decreases, the voltage will be less than $V_{tn}$, and heat must be added to complete the reaction. Although there are methods to add additional heat or to remove excess heat, all such methods result in a thermal gradient in the cell. Thermal gradients result in stresses and are a cause of failure.

SUMMARY

An electrolysis cell for the production of chemical energy from electrical is controlled for operation under varying electrical power supply conditions. A flow of feed stock to the cell includes an electrolysis reactant at a controlled concentration. A varying amount of electrical power is supplied to the cell to produce an electrolysis reaction that generates a first reaction product at a first side of the cell and a second reaction product at a second side of the cell. The reactant concentration is adjusted as the electrical power varies to substantially maintain the cell at its thermal neutral voltage during cell operation.

According to a disclosed embodiment, the electrolysis cell may be constructed a solid oxide electrolysis cell and water may be used as the reactant to provide an electrolysis reaction that produces hydrogen and oxygen as the reaction products. According to a further embodiment, an electrolysis cell (or a stack of electrolysis cells) may be used in an electrolysis system powered by a renewable energy source. The electrolysis cell or stack may comprise a fuel cell or stack that can be selectively operated in an electrolysis mode and in a power generating mode. One or both of the reaction products produced during the electrolysis mode can be recovered and recycled. In the power generating mode, recovered reaction product may be used as feed material. In the electrolysis mode, recovered reaction product may be used to condition the feed stock to promote electrolysis.

BRIEF DESCRIPTION OF THE DRAWINGS

The foregoing and other features and advantages of the invention will be apparent from the following more particular description of example embodiments, as illustrated in the accompanying Drawings, in which.

DETAILED DESCRIPTION OF EXAMPLE EMBODIMENTS

Figure 1:
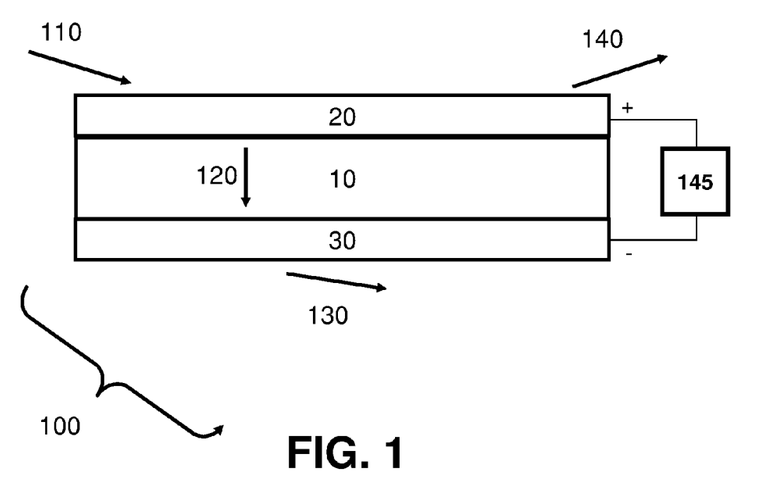
FIG. 1 is a diagrammatic representation of an example electrolysis cell with an attached power supply.

Turning now to FIG. 1, an example electrolysis cell 100 is shown. Depending on design choice, the cell 100 may be constructed in various ways for electrolyzing different types of reactant materials into desired reaction products. By way of example only, the cell 100 may be constructed as a solid oxide electrolysis cell (SOEC) for electrolyzing steam (exemplifying the electrolysis reactant) into hydrogen (exemplifying a first reaction product) and oxygen (exemplifying a second reaction product). As is known in the art, solid oxide electrolysis cells of this type can be built using solid oxide fuel cells (SOFCs) that are capable of operating in the electrolysis mode. A SOFC normally converts a fuel, such as hydrogen into a reaction product such as water by the transmission of a second reaction material, such as oxygen, across a ceramic membrane (the electrolyte). Electrical energy is generated in this conversion process. Some SOFCs also have the ability to reverse this process and thus may be operated as SOECs. Note, however, that although the cell 100 may be constructed using a reversible fuel cell, this is not a requirement.

The cell 100 includes an electrolyte 10 with a first electrode 20 located on one side of the electrolyte and a second electrode 30 located on the other side. During electrolysis operation, an electrolysis reactant 110 will pass over the first electrode 20. When electrical power is supplied to the cell (i.e. across the first electrode 20 and the second electrode 30), a catalyst in the first electrode 20 separates the reactant 110 into ions 120 of a second reaction product 130 and a mixture 140 of a first reaction product and unreacted reactant. The ions 120 pass though the electrolyte 10 and the second reaction product 130 is formed at a catalyst in the second electrode 30. If the cell 100 is a SOEC designed to electrolyze water, the first electrode 20 may be referred to as the hydrogen electrode, the second electrode 30 may be referred to as the oxygen electrode, and the reactant 110 will be high temperature steam. The catalyst in the hydrogen electrode 20 will separate the steam 110 into oxygen ions 120 and a mixture of hydrogen gas and unreacted steam 140. As the oxygen ions 120 pass though the electrolyte 10, oxygen gas 130 will be formed at the catalyst in the oxygen electrode 30.

For water electrolysis, the materials and construction techniques that may be used to fabricate the electrolyte 10, the hydrogen electrode 20 and the oxygen electrode 30 are well known in the art. As such, the details of such materials and construction techniques are omitted in order not to obfuscate the present discussion. Similarly, it will be appreciated that other materials could be used to construct electrolysis cells designed to promote other electrolysis reactions for producing different reaction products. One example is the electrolysis of carbon dioxide into carbon monoxide and oxygen. Again, the materials and construction techniques that may be used to fabricate such electrolysis cells are well known, and will not be described herein.

A power supply 145 provides the electrical power to the cell 100. Examples of energy sources that may be used as the power supply 145 include, but are not limited to, an electrical grid, an electrical generator and a renewable energy source such as a wind turbine, a solar panel array, etc. As described in more detail below, it is assumed that the electrical power available from the power supply 145 varies over time, such that the power supply delivers a varying amount of power to the cell 100.

Figure 2:
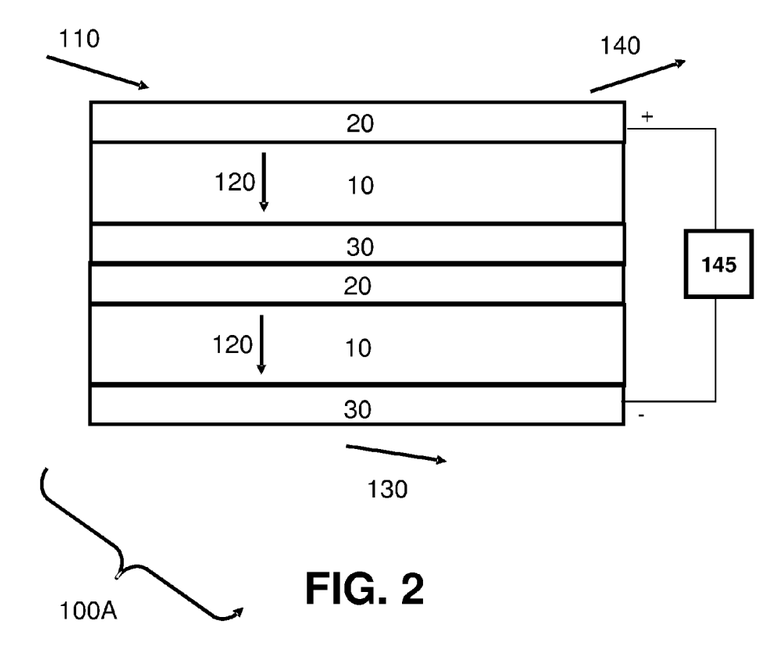
FIG. 2 is a diagrammatic representation of an example electrolysis cell stack comprising two or more electrolysis cells.

FIG. 2 illustrates an electrolysis stack 100A that is constructed from two of the electrolysis cells 100. Additional cells could also be added to the stack 100A, depending on electrolysis production requirements. It will be seen in FIG. 2 that the power supply 145 delivers electrical power to the entire stack. The cells 100 are in electrical series, such that each cell 100 sees the same electrical current and the sum of the voltage drops across each cell corresponds to the total stack voltage. Unless otherwise noted, the term "cell" as used in the remainder of the present discussion (and in the accompanying claims) will be understood to encompass both a single cell, such as the cell 100 shown in FIG. 1, and a stack of two or more cells, such as the stack shown in FIG. 2.

Figure 3:
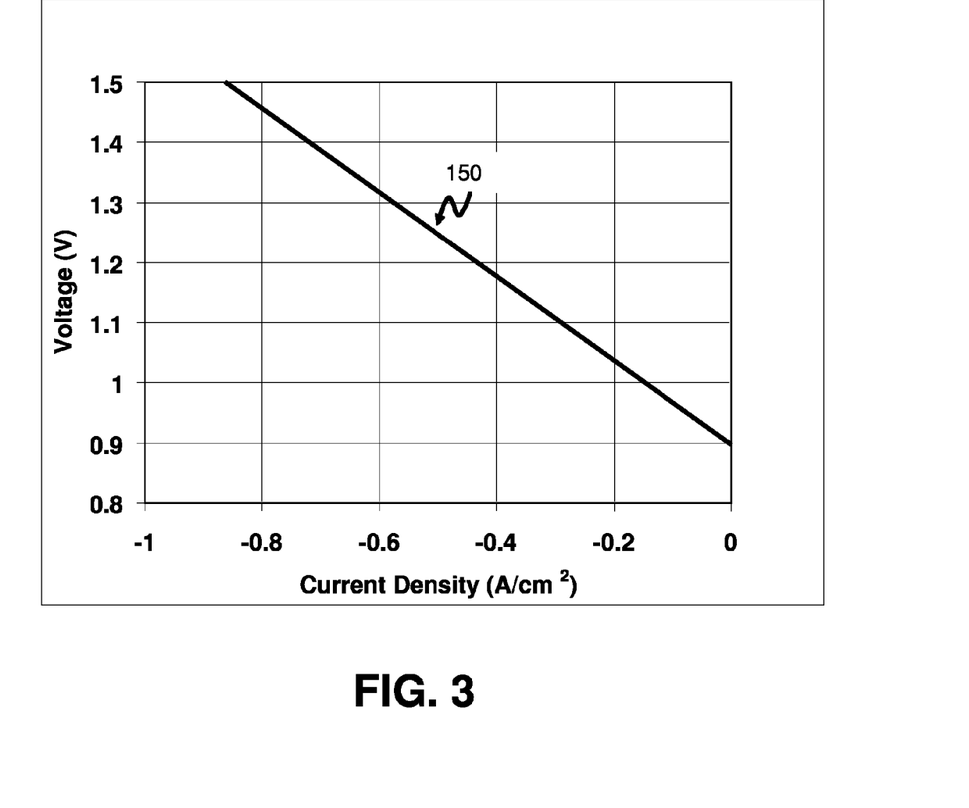
FIG. 3. is a graph showing a voltage versus current curve of a solid oxide electrolysis cell.

The electrical performance characteristic of the cell 100 is characterized by a V-I plot of voltage (V) versus current density (A/cm$^2$). An example of such a plot 150 for a solid oxide electrolysis cell construction is shown in FIG. 3. The current density in FIG. 3 goes from 0.0 to −1.0 Amps/cm$^2$. The value is negative to show that electrical power is being applied to the cell 100. Electrical power is defined as voltage multiplied by current. As the input electrical power changes, the operating voltage and current density of the cell 100 must change but stay on the plot line 150. For example, if the electrical power input to the stack is 1 watt, the voltage will be approximately 1.4 Volts and the current density will be approximately −0.72 Amps/cm$^2$, as shown by reference point 152 in FIG. 4. If the electrical power input to the stack is reduced to 0.6 watts, the voltage will be approximately 1.24 Volts and the current density will be approximately −0.49 Amps/cm$^2$, as shown by reference point 154 in FIG. 4.

As described by way of background above, an electrolysis cell such as the cell 100 has a thermal neutral voltage $V_{tn}$ wherein the thermal energy generated within the cell and the supplied electrical energy equals the energy required to complete the electrolysis reaction. The $V_{tn}$ for a solid oxide electrolysis cell construction is approximately 1.28 Volts. As also described by way of background above, whenever an electrolysis cell is operating at less than the $V_{tn}$, thermal energy is required. This adds additional complexity because heaters are required to maintain operating temperature. When operating at higher than $V_{tn}$, excess heat is generated and cooling is needed. Therefore, any time an electrolysis cell is not operating at $V_{tn}$, additional energy and/or hardware is required to maintain proper operation. Although there are methods to add additional heat or remove excess heat, all the methods result in a thermal gradient within the cell. A solid oxide electrolysis cell typically operates in the range of 650° C. to 1000° C. depending on the specific material used to construct the device. In this environment, thermal gradients can result in severe stresses that lead to eventual failure, especially in a multi-cell stack.

Figure 5:
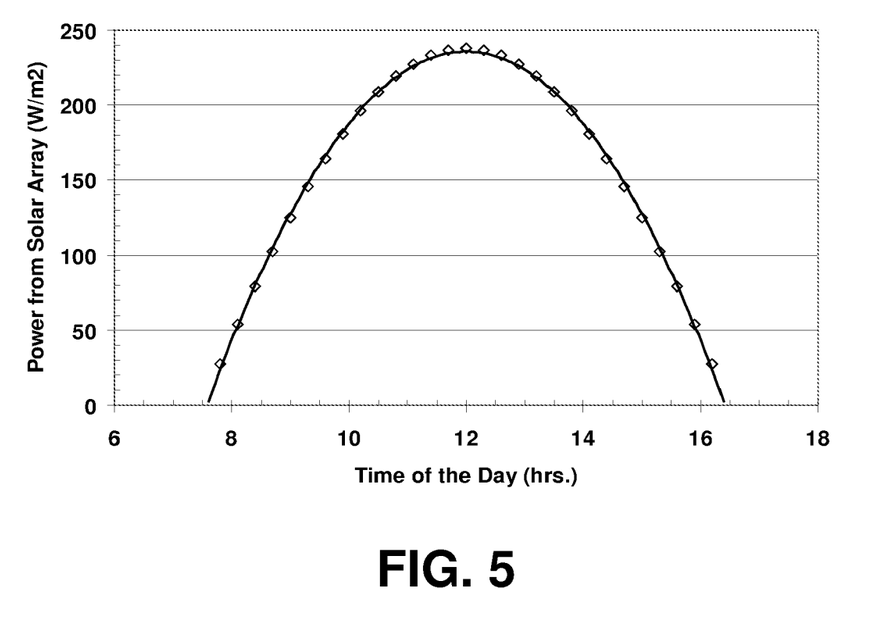
FIG. 5 is a graph showing an power generated by a photoelectric solar array versus time of day.

The foregoing considerations are not particularly problematic when the electrolysis cell is powered from a land-based electrical energy source. In that application, the energy source will provide a relatively constant level of electrical power at a relatively constant voltage. However, the situation is more complicated when the electrical power is provided by variable energy sources such as wind turbines, solar cell arrays, or other renewable energy sources. FIG. 5 is an example of a plot of the power generated by a photoelectric solar array versus the time of the day for a single latitude, altitude and day of the year. Similar curves can be created for other latitudes, altitudes or day of the year. All the curves will have the same general trend of the power starting at or near zero, climbing to a peak, and then dropping off.

In such applications where the electrical power is not constant, it is problematic to use an electrolysis cell designed for a single operating point based on the assumption that a constant power source available. It is instead proposed herein that the operating point of the electrolysis cell should be dynamically changed in response to input power fluctuations in order to substantially maintain the cell at its $V_{tn}$ during cell operation, thereby minimizing thermal gradients and obviating the need for adding or removing heat. The preferred technique is to adjust the concentration of the electrolysis reactant in the feed stock supplied to the electrolysis cell as the incoming electrical power changes. This concentration will typically be a volume percentage of the reactant relative to total feed stock volume, but could also be calculated as a weight percentage. For example, assuming the cell 100 is a SOEC designed to operate with steam as the electrolysis reactant, adjustment would be made to the moisture content of the feed stock as the power provided by the power supply 145 rises and falls.

Figure 4:
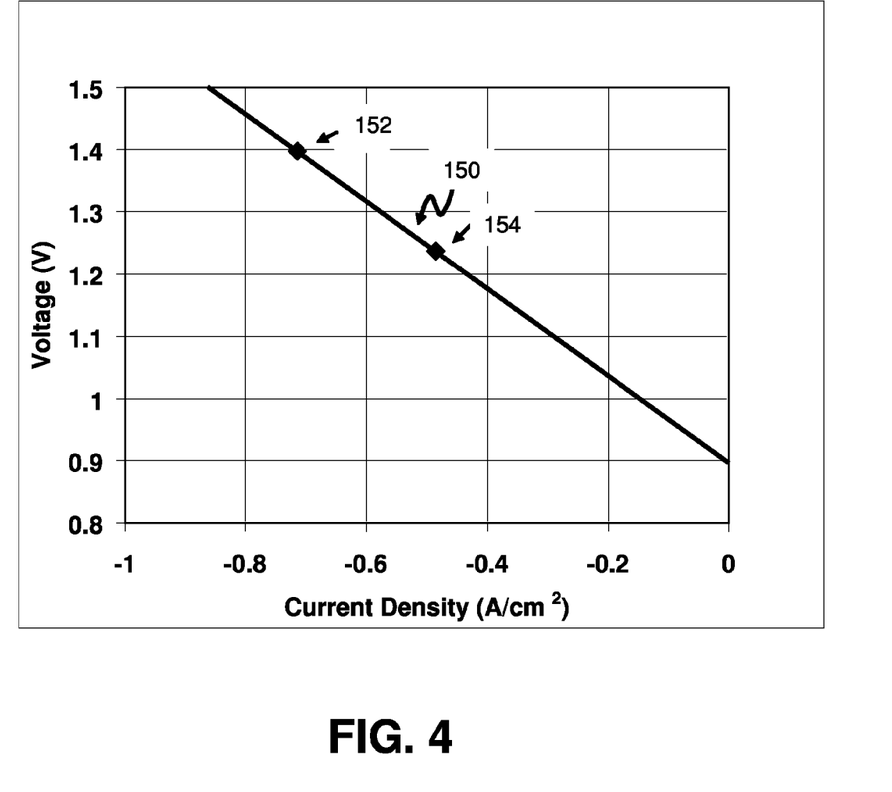
FIG. 4 is a graph according to FIG. 5 showing two points along the voltage versus current curve representing different input power levels.
Figure 6:
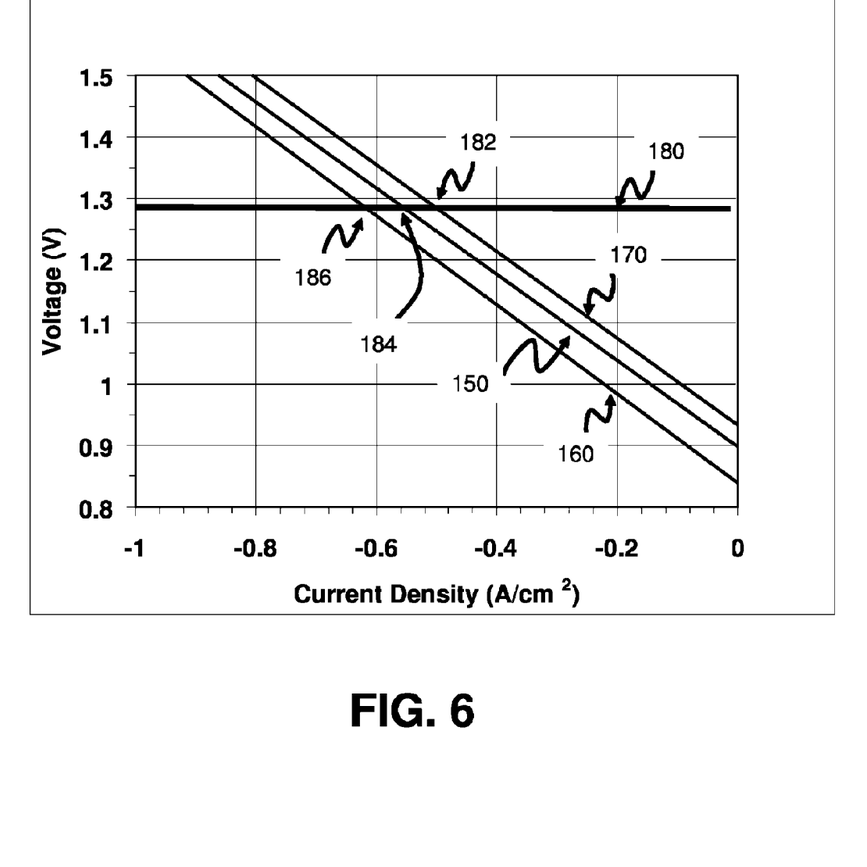
FIG. 6 is a graph showing three voltage versus current curves of a solid oxide electrolysis cell based on different concentrations of electrolysis reactant in feed stock.

FIG. 6 is a graph showing the voltage versus current plot for the cell 100 based on a SOEC water hydrolysis construction. In addition to the plot line 150 of FIGS. 3 and 4, FIG. 6 shows two additional voltage-current density plot lines 160 and 170 representing different concentrations of steam 110 in the feed stock delivered to the cell. The plot line 150 represents a 50% (by volume) steam concentration, the plot line 160 represents a 63% (by volume) steam concentration, and the plot line 170 represents a 33% (by volume) steam concentration. $V_{tn}$ is shown as line 180. Points 182, 184 and 186 are where the corresponding voltage-current density curves 150, 160 and 170 cross the $V_{tn}$ line 180. Table 1 below shows the steam concentration in the input feed stock (expressed as a volume percentage), the operational current density of the cell 100, and the input electrical power provided by the power supply 145 (and required by the cell) for the three $V_{tn}$ crossing points 182, 184 and 186.

TABLE 1

| Reference Point in FIG. 6 | % Water (steam) | Current @ $V_{tn}$ | Electrical Power @ $V_{tn}$ |
|---|---|---|---|
| 182 | 33% | −0.51 Amps/cm² | 0.66 Watts |
| 184 | 50% | −0.56 Amps/cm² | 0.72 Watts |
| 186 | 63% | −0.63 Amps/cm² | 0.81 Watts |

According to Table 1, when the concentration of water is 33%, plot line 170 governs and the electrical power required to operate at $V_{tn}$ is 0.66 Watts, which corresponds to a current density at the $V_{tn}$ crossing point 182 of −0.51 Amps/cm². As the steam concentration changes to 50%, the plot line 150 governs, the required power changes to 0.72 Watts and the current density at the $V_{tn}$ crossing points 184 is −0.56 Amps/cm². As the electrical power is further increased to 0.81 watts, the steam concentration must be 63% and the plot line 160 controls, such that the current density at the $V_{tn}$ crossing point 186 is −0.63 Amps/cm². Additional data points and curve fitting would provide an equation that would model the relationship between electrical power at constant $V_{tn}$ and $H_2O$ (steam) concentration.

As can be seen, by adjusting the feed stock moisture content in response to fluctuations in available electrical power, the current required to operate at the thermal neutral point is changed, thereby maintaining the desired thermal neutral voltage level $V_{tn}$. As the input electrical power rises, the steam concentration is correspondingly increased. As the input electrical power falls, the steam concentration is correspondingly decreased. It will be appreciated that the precise relationship between steam concentration and the crossing point of the $V_{tn}$ line 180 is dependent on the specific construction of the cell 100, but may be readily determined and characterized, as indicated above. Similar relationships for other electrolysis cells using other reactants may likewise be determined.

Figure 7:
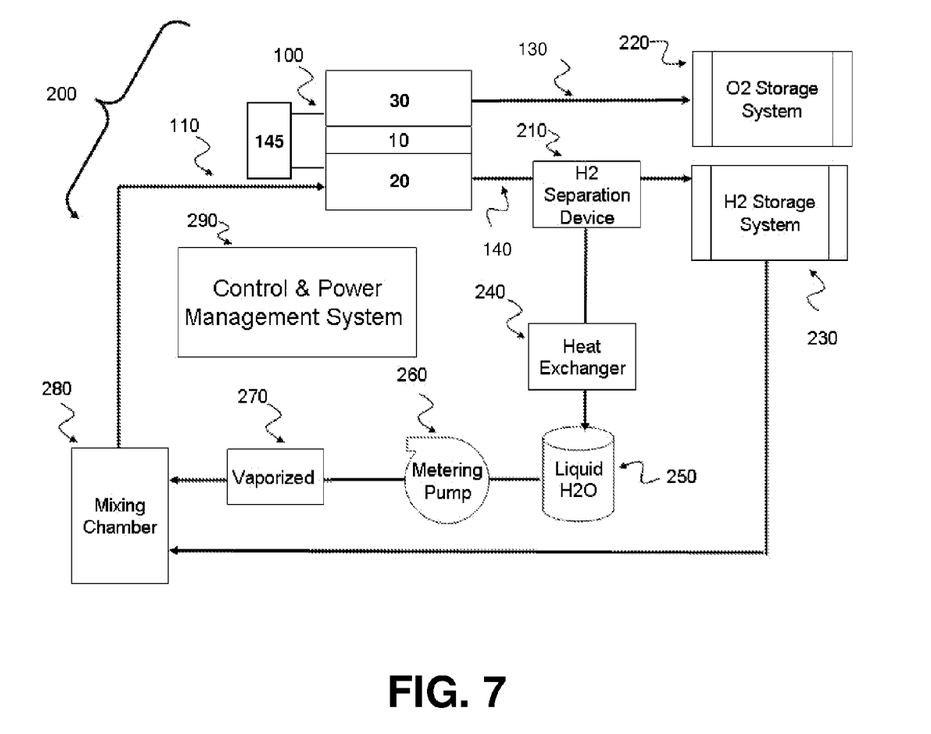
FIG. 7 is a block diagram showing an example electrolysis system that may include the electrolysis cell of FIG. 1 or the electrolysis stack of FIG. 2.

Turning now to FIG. 7, an electrolysis system 200 may be constructed using the cell 100. As was shown in FIG. 1, electrical power delivered from the power supply 145 to the cell 100 converts the input steam 110 reactant into the oxygen gas reaction product 130 and the mixture 140 containing the hydrogen gas reaction product and unreacted steam. The oxygen gas 130 is transported to an $O_2$ storage system 220. The mixture of steam and hydrogen gas 140 is separated by the $H_2$ separation device 210. The hydrogen gas is stored in the $H_2$ storage system 230. The steam is cooled in a heat exchanger 240 and stored in the liquid $H_2O$ tank 250. A metering pump 260 delivers water from the liquid $H_2O$ tank 250 to a vaporizer 270 to convert it into steam. The steam is mixed with hydrogen gas from the $H_2$ storage system 230 in a mixing chamber 280 and heated to the operating temperature of the cell 100. If desired, heat removed by the heat exchanger 240 can be used to preheat gases exiting the mixing chamber 280, or to assist vaporizer 270.

A control and power management system 290 (which may be computerized) provides a controller that monitors incoming electrical power available to the cell 100 and controls the metering pump 260 to provide the required amount of water from the liquid $H_2O$ storage tank 250 to adjust the humidity level (i.e., concentration) of the steam 110 flowing to the cell relative to the total amount of feed stock, which includes the recycled hydrogen and possibly other components (e.g., nitrogen), preferably without changing feed stock flow rate.

One application where the system 200 may be used is in long flight duration aircraft that includes a renewable energy source such as on-board solar panels. For such aircraft, the system 200 can be used to produce hydrogen utilizing electrical power from the solar panels. As $H_2O$ gas flows through the cell 100, it is converted to $H_2$ and $O^{-2}$. The $O^{-2}$ pass through the membrane and exists the cell as $O_2$. The ability of the system 200 to recover the $H_2$ and the $O_2$ is advantageous. The recovered hydrogen reaction product can be recycled back to the cell 100 and used to condition the feed stock to promote the electrolysis reaction. The recovered oxygen can be used to support long duration high altitude flight.

Further versatility may be obtained when the cell 100 is constructed as a fuel cell capable of reverse operation as an electrolysis cell. During periods of time when electrical power is needed (no longer available from the solar panels) the operation of the cell 100 can be reversed to the fuel cell mode. In that case, the hydrogen generated in the electrolysis mode is recovered and recycled as fuel to generate electrical power. The oxygen generated in the electrolysis mode can be similarly recycled to the fuel cell to supplement the ambient oxygen available in or around the aircraft.

Accordingly, technique for operating an electrolysis cell under conditions of varying electrical power, together with an example electrolysis system, have been disclosed. Although various embodiments have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for operating an electrolysis cell under varying electrical power supply conditions, comprising:
    providing a flow of feed stock to a first side of said cell, said feed stock comprising an electrolysis reactant at a controlled concentration;
    supplying varying electrical power to said cell to produce an electrolysis reaction that generates a first reaction product at a first side of said cell and a second reaction product at a second side of said cell; and
    adjusting said reactant concentration as said electrical power varies to substantially maintain said cell at its thermal neutral voltage during cell operation.

2. The method of claim 1 wherein said reactant concentration is increased as said electrical power increases and wherein said reactant concentration is decreased as said electrical power decreases.

3. The method of claim 1, wherein reactant concentration is varied without changing a flow rate of said feed stock.

4. The method of claim 1, wherein said feed stock further comprises a recycled reaction product captured from said cell.

5. The method of claim 4, wherein said reactant concentration is controlled by controllably mixing said reactant and said recycled reaction product in said feed stock.

6. The method of claim 1 wherein the feed gas comprises steam, the first reaction product comprises hydrogen and the second reaction product comprises oxygen.

7. The method of claim 1 wherein the electrolysis cell is a solid oxide electrolysis cell.

8. An electrolysis system, comprising:
an electrolysis cell;
an feed input providing a flow of feed stock to said cell, said feed stock comprising an electrolysis reactant at a controlled concentration;
a power supply supplying varying electrical power to said cell to produce an electrolysis reaction that generates a first reaction product at a first side of said cell and a second reaction product at a second side of said cell; and
a controller programmed to adjust said reactant concentration as said electrical power varies to substantially maintain said cell at its thermal neutral voltage during cell operation.

9. The system of claim 8 wherein said controller increases said reactant concentration as said electrical power increases and decreases said reaction concentration as said electrical power decreases.

10. The system of claim 8, wherein said controller varies said reactant concentration without changing a flow rate of said feed stock.

11. The system of claim 8, wherein said feed stock further comprises a recycled reaction product captured from said cell.

12. The system of claim 11, wherein said controller controls said reactant concentration by controllably mixing said reactant and said recycled reaction product in said feed stock.

13. The system of claim 8 wherein said reactant comprises steam, said first reaction product comprises hydrogen and said second reaction product comprises oxygen, and wherein said electrolysis cell is a solid oxide electrolysis cell.

14. The system of claim 13, further including a steam recycling system and a hydrogen recycling system that respectively recycles steam and hydrogen recovered from said cell for introduction into said feed stock.

15. The system of claim 14, wherein said steam recycling system comprises a heat exchanger that cools said recovered steam into water, a water storage vessel in fluid communication with said heat exchanger, a water metering pump in fluid communication with said storage vessel, and a vaporizer in fluid communication with said metering pump that heats said water into said steam and delivers it to a feed stock mixing chamber.

16. The system of claim 14, wherein said hydrogen recovery system comprises a hydrogen separator that separates said recovered hydrogen from said recovered steam, a hydrogen storage vessel in fluid communication with said hydrogen separator and with a feed stock mixing chamber.

17. The system of claim 13 wherein said power supply derives electrical power from a renewable energy source selected from the group consisting of solar power sources and wind power sources.

18. The system of claim 13, wherein said cell comprises a solid oxide fuel cell operated in an electrolysis mode, and wherein said controller periodically operates said system in a fuel cell power generating mode by recovering and recycling said hydrogen and said oxygen for use a feed fuel.

19. An electrolysis system, comprising:
a solid oxide electrolysis cell, said cell being constructed for electrolysis of water and having an electrolyte, a hydrogen electrode on a first side of the electrolyte and an oxygen electrode on a second side of the electrolyte;
a feed input providing a flow of feed stock to said hydrogen side of said cell, said feed stock comprising steam at a controlled humidity level;
a power supply supplying varying electrical power to said cell to produce an electrolysis reaction that generates hydrogen at said hydrogen side of said cell and oxygen at said oxygen side of said cell;
a controller programmed to adjust said humidity level as said electrical power varies to substantially maintain said cell at its thermal neutral voltage during cell operation;
said humidity level being increased by said controller as said electrical power increases and said humidity level being decreased as said electrical power decreases; and
said humidity being varied by said controller without changing a flow rate of said feed stock.

20. The system of claim 18, wherein said feed stock further comprises recycled hydrogen recovered from said hydrogen side of cell, and wherein said controller controls said humidity level by controllably mixing said steam and said recycled hydrogen in said feed stock.

21. The system of claim 18, wherein said cell is part of a power system in a vehicle.

22. The system of claim 21, wherein said vehicle comprises a long flight duration aircraft.

\* \* \* \* \*